United States Patent [19]

Wheeler

[11] 4,124,190
[45] Nov. 7, 1978

[54] FISHING ROD HOLDER

[76] Inventor: Herbert O. Wheeler, 447 State St., Hammond, Ind. 46320

[21] Appl. No.: 817,697

[22] Filed: Jul. 21, 1977

[51] Int. Cl.² ............................................. A01K 97/10
[52] U.S. Cl. ................................................... 248/538
[58] Field of Search ............... 248/518, 538, 534, 540, 248/541

[56] References Cited

U.S. PATENT DOCUMENTS

| 1,760,592 | 5/1930 | Gift | 248/538 |
|---|---|---|---|
| 3,184,192 | 5/1965 | Hoerr | 248/538 |
| 3,306,560 | 2/1967 | Wheeler | 248/538 |
| 3,359,546 | 7/1966 | Rogers | 248/538 X |

Primary Examiner—Francis K. Zugel
Attorney, Agent, or Firm—Sabin C. Bronson

[57] ABSTRACT

A fishing rod holder is provided which can be used to support a fishing rod for fishing from the shore of a lake or stream, by pushing the same into the ground sufficiently for it to remain upright. The basic holder comprises a round metal rod pointed at its lower end, and threaded for approximately a third of its length. At the upper end the rod is bent into an outwardly and downwardly curved portion forming a cradle to support the end of the handle of a fish pole. The rod is then bent to extend outwardly and terminates in another downwardly and upwardly curved portion forming a cradle in which the other end of the handle may rest. The lower portion of the rod is provided with means for supporting the same on a dock, on the gunwale or the transom of a boat, in the oarlock or in the ground adjacent the shore of a lake or stream.

2 Claims, 4 Drawing Figures

U.S. Patent  Nov. 7, 1978  4,124,190
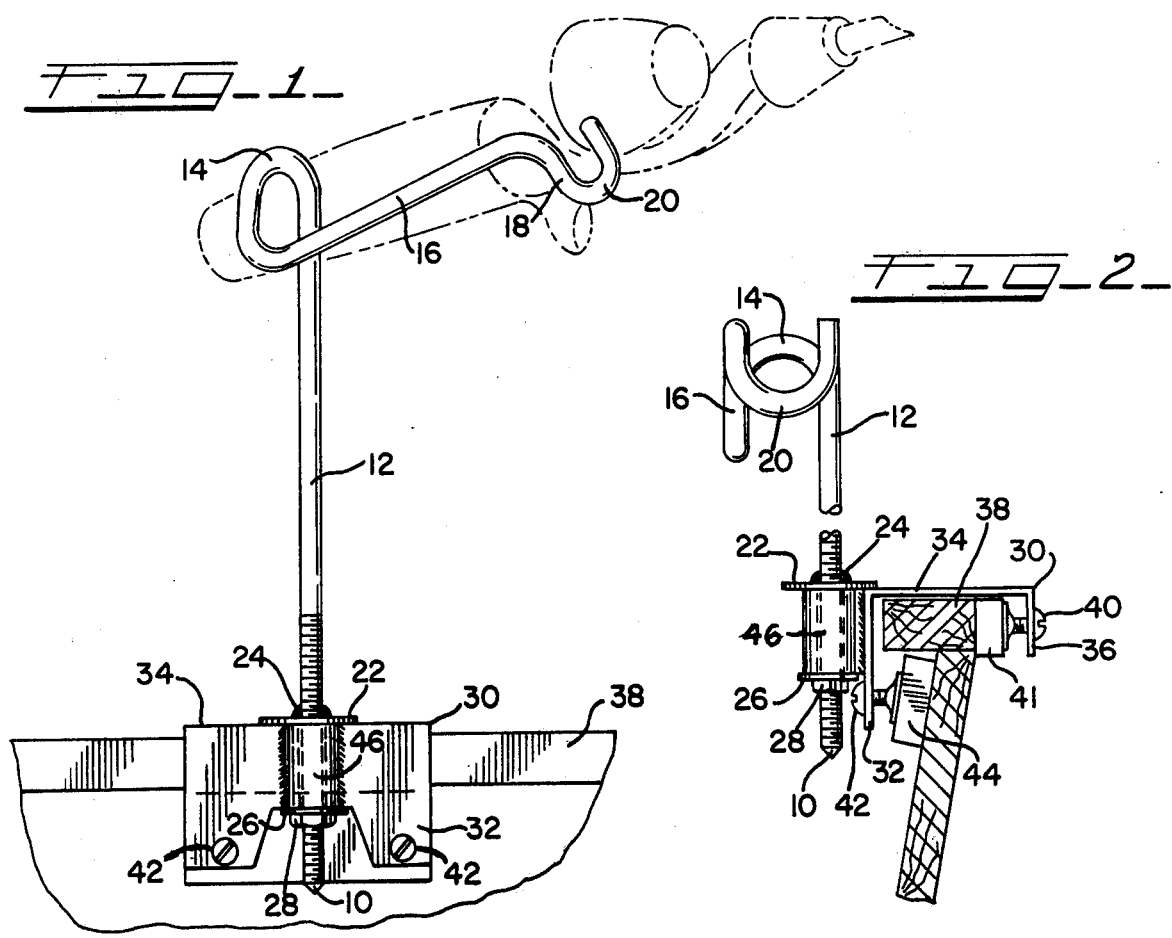
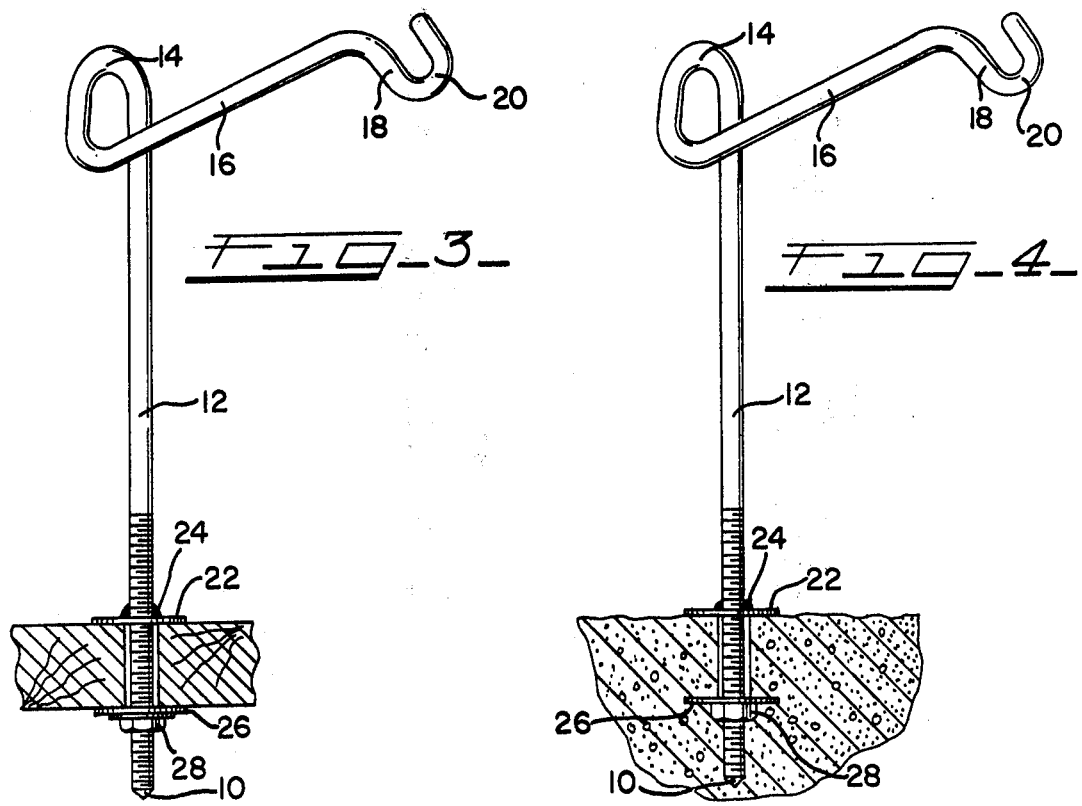

FISHING ROD HOLDER

This invention is an improvement over the invention covered in my former U.S. Pat. No. 3,306,560 of Feb. 28, 1967.

BACKGROUND AND SUMMARY OF THE INVENTION

The fishing rod holders of the prior art and those currently used are suitable for their purposes, but applicant has devised a rod holder that can be used in any five different ways, and this is the principal purpose of the invention.

Simplicity of design, resulting in a much more economical holder, is also a principal feature of the invention.

BRIEF DESCRIPTION OF THE DRAWINGS

Referring now to the accompanying drawing forming part of this application and wherein like reference characters indicate like parts:

FIG. 1 is a side elevation of my improved holder, made in accordance with my present invention, showing its possible use in connection with an oarlock of a boat, where the oarlock is installed inboard of the boat.

FIG. 2 is a view, at right angles to FIG. 1 partly in section, of the holder of FIG. 1.

FIG. 3 is a side view of the holder as applied to a dock or platform for holding the fishing rod; and FIG. 4 is a similar view of the holder as applied in soil for fishing from the shore of a stream or lake.

DESCRIPTION OF THE PREFERRED EMBODIMENT

As will be apparent from the drawing the fish rod holder is made of round cold rolled steel, pointed at its lower end as at 10 and is screw-threaded for approximately a third of the distance of a straight portion 12 comprising the main body of the holder. At the upper end of the body portion the bar is bent outwardly and downwardly a full 180° as at 14, is then turned laterally into a shorter straight portion 16, is then bent downwardly as at 18, and then bent into another 180° bend as at 20, so that the axes of the two 180° bends are coincident, or on the same line. In this manner the two bends form cradles for the opposite ends of a fishing rod handle. The forward end of the handle of the fish rod rests in the cradle 20 and since the major weight of the fish rod is outwardly from the cradle 20, the rear end of the handle would be held up against the cradle 14, and the fishing rod thus supported until a fish takes the bait, when the reeling in process by the fisherman begins.

At the lower portion of the body portion 12 of the holder, about in the middle of the threaded portion, there is a washer 22 which is welded to the portion 12 on the upper surface as indicated at 24. Ordinarily when fishing from the shore of a body of water, just the body portion with the washer 22 welded thereto is thrust into the ground, with nothing on the body portion below the washer 24. Washer 24 rests on top of the ground and stabilizes the holder.

Of course if the ground is soft or sandy, It may be desirable to apply the washer 26, held in position thereon by the lock nut 28, and press it into the sand, for further stability of the holder, as shown in FIG. 4.

Should this not be sufficient to adequately stabilize the holder, the clamp 30, welded to the cylinder 46, in which the body portion of the holder is clamped by bolt 28, without the blocks 41 and 44 or bolts 40 and 42, may be pressed into the ground until the web 34 of the clamp rests on the surface of the ground. It is known that this will adequately stabilize the holder while fishing from a shore or beach.

Should one be fishing from a dock or pier, the body portion 12 may be placed down through the space between the boards, and then the washer 26 and nut 28 applied and run up against the bottom of the boards to secure the holder firmly in place while fishing.

When the device is used in connection with the oarlock on a boat, the body portion 12 of the holder is passed down through the oarlock, and the washer 26 and nut 28 run up against the bottom of the oarlock.

In cases where my device is used by applying it to the side wall of a boat, I have provided a clamp 30, which is a piece of flat metal in channel form comprising a flange 32, web 34 and flange 36, the flange 32 being wider than the flange 36, with the web 34 spanning and resting upon the gunwale 38 of the boat.

To secure this clamp to the boat without marring the finish of the gunwale a bolt 40 is screw-threadedly applied in a threaded hold in flange 36 and at the end of the bolt is a washer swively secured thereto so that when the bolt 40 is turned up the washer will press flatwise against the side of a wooden block 41 forcing it against the gunwale and hold the clamp in place.

Similarly the flange 32 has a like arrangement of bolt 42 with a washer swively secured on the end thereof to press the wooden block 44 against the boat side, thereby further holding the clamp in place.

In this modification the cylinder 46 which surrounds the body portion 12, is welded to the flange 32, thus maintaining the fish rod holder in place.

Having thus described the preferred embodiment of my invention, what I claim and desire to secure by Letters Patent is:

1. In a fishing rod holder comprising in combination an elongated metal rod, the upper portion being turned laterally forming a cradle and at the end formed into a second cradle for supporting a fishing rod, the lower portion being straight and screw threaded with a washer secured to said rod near the upper end of said screw threaded portion, a channel-shaped clamp for application anywhere along the gunwale of a boat, a sleeve fixed to one flange of said clamp through which said threaded rod portion is passed and secured therein by means of a washer and nut, said one flange having a pair of bolts extending through said flange for engaging the inside of said boat, and similar bolts extending through the outer flange to engage the outer surface of said boat to maintain the holder in place on said gunwale.

2. The fishing rod holder as specified in claim 1 wherein a protecting pad is provided between the ends of the bolts and the sides of said gunwale to protect the finish thereof.

* * * * *